United States Patent [19]

Dubost et al.

[11] 4,089,154
[45] May 16, 1978

[54] TAPING DEVICE, PARTICULARLY FOR OPTICAL FIBRES

[75] Inventors: René Dubost, Faverges de la Tour; Bernard Grenat, La Mulatiere, both of France

[73] Assignee: Les Cables de Lyon S.A., Lyon, France

[21] Appl. No.: 783,018

[22] Filed: Mar. 30, 1977

[30] Foreign Application Priority Data

Apr. 6, 1976   France .................................. 76 09920

[51] Int. Cl.² .............................................. D02G 3/38
[52] U.S. Cl. .............................................. 57/3; 57/10; 242/7.08; 242/7.23
[58] Field of Search ........................ 57/3, 10, 13, 106; 156/425, 428–431; 242/7.08, 7.21, 7.23

[56] References Cited

U.S. PATENT DOCUMENTS

| | | | |
|---|---|---|---|
| 1,204,342 | 11/1916 | Cobb | 57/3 |
| 1,526,572 | 2/1925 | Ten Eyck | 57/3 |
| 2,544,442 | 3/1951 | Boyce | 57/3 |
| 2,927,415 | 3/1960 | Smith, Jr. | 57/3 |
| 3,077,068 | 2/1963 | Miller | 57/13 X |
| 3,301,505 | 1/1967 | Meharty | 156/425 X |

Primary Examiner—Richard C. Queisser
Assistant Examiner—Charles Gorenstein
Attorney, Agent, or Firm—Haseltine, Lake & Waters

[57] ABSTRACT

A taping device permitting tension-free winding of tapes. It comprises guide hooks between which the tape passes disposed as close as possible to the product to be taped. Applications: manufacture of optical fibre telecommunications cables and special cables.

3 Claims, 1 Drawing Figure

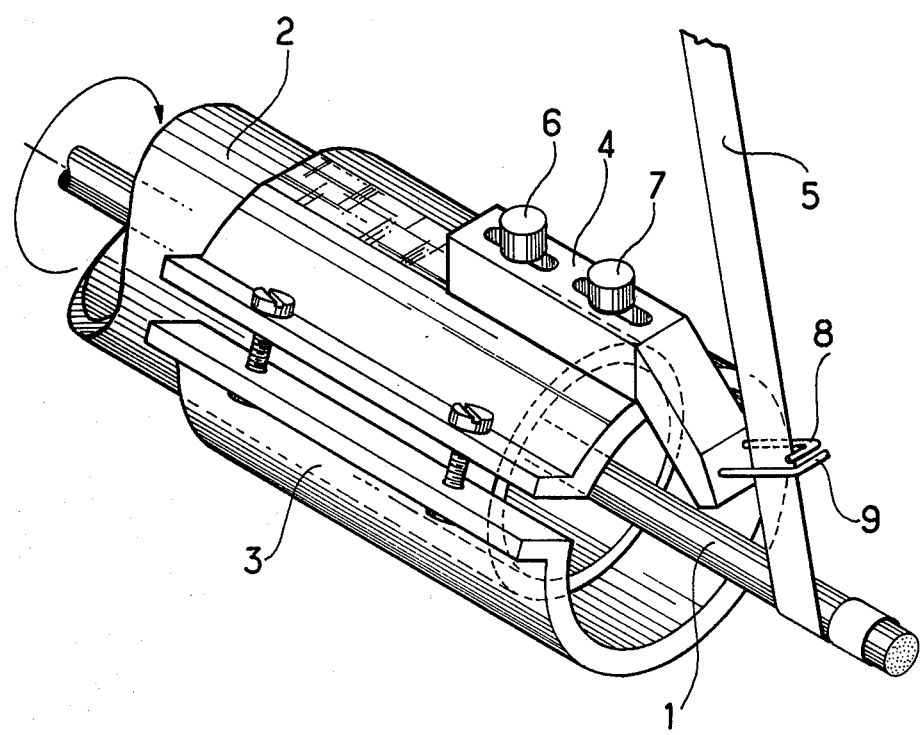

TAPING DEVICE, PARTICULARLY FOR OPTICAL FIBRES

The present invention relates to a device for taping products such as optical fibres and optical fibre cables as used in telecommunications.

It is known to sheath individual fibres with a plastics material, but nonetheless they remain fragile. In traction, they must not be subject to some upper limit force for fear of breaking the fibre and lateral pressures deform the geometrical axis of the fibre thus causing high attenuation.

Covering with a tape made of cellular material constitutes an advantageous technique for the protection of assembled optical fibres. Transversal stresses caused by bending of the cable are clamped before being transmitted to the fibres.

In most cases, tension-free tape laying has been achieved by means of longitudinal tapes. The product thus formed has the disadvantage of not having circular symmetry and of giving rise to an excess thickness perpendicular to the covering.

In order to constitute a cable, according to another method, fibres each having an individual protective sheathing have been assembled. A central carrier provides longitudinal strength. To prevent interaction between the carrier and the sheathed fibres, tape made of cellular material is disposed on the carrier by contiguous helical winding. Sheathed fibres are disposed in a ring configuration on this protected carrier while making due allowance for their diameters in order to have a determined play between each fibre. The fibres are disposed helically. Tape made of cellular material is again wound helically and contiguously above this assembly to protect it against external lateral forces. The assembly thus formed is then covered with a sheath of plastics material.

In the cable structure chosen, taping with tapes made of cellular material is provided at two levels: at the carrier to constitute an internal damping buffer, i.e. under the ring of fibres and at the level of the fibres to constitute an external damping buffer, i.e. above the ring of fibres.

To tape, it is conventional to use taping machines constituted by sub-assemblies or tangential taping heads. The main axis of the machine is the same as the axis of the product to be taped. The tape is helically laid by the composition of two movements: an advancing movement of the product to be taped at constant speed through the head; and a rotary movement of the tape about the main axis. A judicious choice of the speeds makes it possible to lay the tape in contiguous turns. The tape is stocked on spools which unwind the required amount of tape, these spools being installed on the rotating part of the head and rotating, with the head about the main axis of the machine. A taping head could carry two or more tapes to form a plurality of simultaneous layers. The tapes are deposited at a "taping point". In a conventional machine, the tapes are guided on the output side of the spool by a number of guide rolls, the last roll generally being at a distance from the taping point. In order to obtain a stable taping point for each tape, the tape must be highly tensioned as it is applied onto the product to be taped. This tension is provided in conventional machines by means of a guide hook round which the tape is wound. If the taping points are unstable there results crossing of the tape and this defect affects the taped product; further, the taping pitch is variable in this case and the tapes alternatively overlap or become non-contiguous, this obviously giving rise to other defects.

Preferred embodiments of the present invention allow the helical tape to be guided very close to the various taping points without winding the tape round a guide disposed close to the taping point; they therefore avoid the unstability of such points while allowing tension-free taping which has two advantages for assembly. Firstly, in the case of tape made of cellular material, it avoids applying tension to the tape as it is deposited. This allows cellular material to be used without its being crushed under the effect of a small radius of curvature of the product to be taped. Crushing would cause an unwanted reduction of its radial resilience. Secondly, in the case of tape (whether made of cellular or other material) which is to be laid at low tension together with a taping head which operates with an odd number of tapes or in the case of high tension tape laying together with fluctations of the tension due to the machine, the preferred embodiments avoid the product to be taped being alternately bent in opposite directions which could damage it especially when the product comprises optical fibres.

The present invention provides a taping device for taping products which require tension-free application of tapes having a high modulus of compressibility to the product the taping device comprising a die-box mounted to rotate about the product to be taped which lies along the main axis of the device, a support gripping said die-box, a plurality of tape guides fixed on said support pairs of L-shaped hooks fixed on said tape guides to guide the tapes at a point distant from the taping point by a distance of not more than twice the diameter of the product to be taped, wherein said support is adjustable on the die-box to rotate about and to move linearly along the main axis of the machine, so as to adjust the position of the taping points and wherein the tape guides are adjustable independently on their support in a linear movement parallel to the main axis of the device.

An assembly embodying the present invention, given purely by way of illustration and having no limiting character will be described with reference to the single FIGURE which is a diagrammatic perspective view showing the end of a taping head.

The end of the taping device is formed by a tubular die-box containing at its right-hand end a die (not shown) for keeping the product to be taped 1 (an optical fibre or a cable of optical fibres) on the main axis of the machine.

A support sleeve 3 is fixed to grip the die-box 2; it can therefore be adjusted to move linearly on the main axis of the machine and to rotate on the die-box 2. One particularity of this support sleeve 3 is that it can be extracted from the machine without cutting the product to be taped.

The support sleeve 3 supports several tape guides 4 only one of which has been shown. The number of tape guides is a function of the number of tapes 5 on the tape head of the machine. These tape guides 4 are independently adjustable for linear movement in relation to the main axis of the machine on the support sleeve 3, thus enabling an adjustment of the taping point of each tape.

Thus, by means of this adjustment, it is possible to have complete mastery of the contiguity of two turns of tape and to position the turns of one layer perfectly in relation to those of another layer.

The tape guide 4 is formed by a parallelepipedical part disposed parallel to the main axis, on which two screws 6 and 7 are deposited in slots permitting the longitudinal displacement and fixing of the tape guide 4 on the support sleeve 3.

Two L-shaped hooks 8 and 9 inclined at 45° in relation to the main axis of the machine are disposed at the end of the tape guide 4; they are staggered so as to form a passage for the tape 5 to be laid. These L-shaped hooks are approximately disposed on the axis of the tape, between the last guide roll and the taping point.

One of the hooks is adjustable as a function of the width of the tape to be laid. The L-shaped hooks have the advantage of permitting assembly or dismantling without cutting the tape.

The L-shaped hooks and their support constituted by the inclined part of the tape guide 4 must be situated as near as possible to the taping point.

They will be advantageously disposed at a distance from the taping point which is less than or equal to about twice the diameter of the product to be taped. For example, if the product is a cable with a diameter of 10 millimeters, the distance between the taping point and the L-shaped hooks will be 2 centimeters.

The present invention permits the addition on a taping machine of a device which guides the tape very close to its taping point. The device can be supported by a tubular die-box of the machine or by any other system of the assembly which rotates about the product to be taped.

Such a device, adaptable on a taping machine, permits the adjustment of the taping points with precision, this preventing overlapping of tape, thus giving the possibility of taping with a minimum of tension, and hence of taping tapes based on cellular material and also to tape onto products which are not very stretched.

Applications come within the field of the production of special cables, in particular optical fibre telecommunications cables, i.e., in all fields in which fragile products are to be taped with cellular tapes or tapes which are not very stretched.

What we claim is:

1. A taping device for taping products which require tension-free application of tapes having a high modulus of compressibility to the product, the taping device comprising a die-box mounted to rotate about the product to be taped which lies along the main axis of the device, a support gripping said die-box, a plurality of tape guides fixed on said support, pairs of L-shaped hooks fixed on said tape guides to guide the tapes at a point distant from the taping point by a distance of not more than twice the diameter of the product to be taped, wherein said support is adjustable on the die-box to rotate about and to move linearly along the main axis of the machine, so as to adjust the position of the taping points and wherein the tape guides are adjustable independently on their support in a linear movement parallel to the main axis of the device.

2. A device according to claim 1, wherein one of the said two hooks of each pair is stationary and the other is adjustable.

3. A device according to claim 1, wherein the support is in the form of a clamping member which has a peripheral slot with means for drawing the sides of the slot together for clamping, wherein the said means are movable to free the slot for the passage of the product to be taped, whereby the support and the tape guides may be removed from or applied to a die-box while it is threaded with the product to be taped.

* * * * *